US011328727B2

(12) United States Patent
Sugaya (10) Patent No.: US 11,328,727 B2
(45) Date of Patent: May 10, 2022

(54) SPEECH DETAIL RECORDING SYSTEM AND METHOD (71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 299 days.

(21) Appl. No.: 16/499,450

(22) PCT Filed: Mar. 31, 2017

(86) PCT No.: PCT/JP2017/013825
§ 371 (c)(1),
(2) Date: Feb. 18, 2020

(87) PCT Pub. No.: WO2018/179425
PCT Pub. Date: Oct. 4, 2018

(65) Prior Publication Data
US 2020/0312325 A1 Oct. 1, 2020

(51) Int. Cl.
*G10L 15/26* (2006.01)
*G10L 15/22* (2006.01)
(Continued)

(52) U.S. Cl.
CPC .............. *G10L 15/26* (2013.01); *G10L 15/22* (2013.01); *H04L 67/025* (2013.01); *H04L 67/18* (2013.01)

(58) Field of Classification Search
None
See application file for complete search history.

(56) References Cited

U.S. PATENT DOCUMENTS 9,773,209 B1 * 9/2017 Champaneria .......... G06F 16/00
2002/0010941 A1 * 1/2002 Johnson ............. H04N 21/4622
725/108
(Continued)

FOREIGN PATENT DOCUMENTS

JP 2002-340580 A 11/2002
JP 2011-179917 A 9/2011
(Continued)

OTHER PUBLICATIONS

International Search Report issued in PCT/JP2017/013825 dated Jun. 20, 2017.
(Continued)

*Primary Examiner* — Neeraj Sharma
(74) *Attorney, Agent, or Firm* — Norton Rose Fulbright US LLP; James R. Crawford (57) ABSTRACT Provided is a system for recording a voice about a working state, etc., linking the recorded voice to position information, and converting the recorded voice into a text. In a voice detail recording system (1), a control unit (10) executes an acquisition module (11) to acquire a voice and a position where the voice is uttered. In addition, the control unit (10) executes a voice recognition module (12) to perform voice recognition on the acquired voice. In addition, the control unit (10) executes a specification module (13) to specify Web content linked to the position acquired by executing the acquisition module (11). In addition, the control unit (10) executes a recording module (14) to record details obtained by executing the voice recognition module (12) to perform the voice recognition in the Web content specified by executing the specification module (13).

8 Claims, 9 Drawing Sheets

Web content database 33

1. Range specification

| Identification number | Field | Range | |
|---|---|---|---|
| | | Latitude | Longitude |
| 1 | Yamada field A | Northern latitude of 35°51'55" - Northern latitude of 35°52'10" | East longitude of 139°46'55" - East longitude of 139°47'5" |
| 2 | Yamada field B | Northern latitude of 35°52'10" - Northern latitude of 35°52'20" | East longitude of 139°46'55" - East longitude of 139°47'5" |
| 3 | Yamada field C | Northern latitude of 35°52'20" - Northern latitude of 35°52'30" | East longitude of 139°46'55" - East longitude of 139°47'5" |
| : | : | : | : |

2. Growth state of crop

| Identification number | Date | Weather | Field | Crop | Stem | Soil | Harvest | Pest | Withering |
|---|---|---|---|---|---|---|---|---|---|
| 1 | February 1, 2017 | Sunny | Yamada field A | Scallion | 20 cm | Good | | | |
| | February 7, 2017 | Cloudy | Yamada field A | Scallion | 25 cm | Good | | | |
| | February 14, 2017 | Sunny | Yamada field A | Scallion | | | | | |
| : | : | : | : | : | : | : | : | : | : |

(51) Int. Cl.
*H04L 67/025* (2022.01)
*H04L 67/52* (2022.01)

(56) References Cited

U.S. PATENT DOCUMENTS

| | | | | | |
|---|---|---|---|---|---|
| 2003/0030677 | A1* | 2/2003 | Hirneisen | | G09B 23/38 |
| | | | | | 715/810 |
| 2003/0208472 | A1* | 11/2003 | Pham | | H04L 29/06 |
| 2004/0141597 | A1* | 7/2004 | Giacomelli | | G10L 15/26 |
| | | | | | 379/88.17 |
| 2010/0179754 | A1* | 7/2010 | Faenger | | G06F 16/9537 |
| | | | | | 701/532 |
| 2011/0053559 | A1* | 3/2011 | Klein | | G07C 13/00 |
| | | | | | 455/411 |
| 2014/0002444 | A1* | 1/2014 | Bennett | | G06F 3/0304 |
| | | | | | 345/419 |
| 2014/0358545 | A1* | 12/2014 | Robichaud | | G10L 15/18 |
| | | | | | 704/257 |
| 2015/0067819 | A1* | 3/2015 | Shribman | | H04L 65/4084 |
| | | | | | 726/12 |
| 2015/0185985 | A1* | 7/2015 | Kang | | G06F 16/9562 |
| | | | | | 715/728 |
| 2016/0019556 | A1* | 1/2016 | Mazniker | | G06F 16/29 |
| | | | | | 705/7.29 |
| 2016/0290820 | A1* | 10/2016 | Nakagawa | | G01C 21/3605 |
| 2017/0177710 | A1* | 6/2017 | Burlik | | G01C 21/3667 |

FOREIGN PATENT DOCUMENTS

| | | |
|---|---|---|
| JP | 2014202848 A | 10/2014 |
| JP | 2016-514314 A | 5/2016 |
| WO | 2014057540 A1 | 4/2014 |
| WO | 2015133142 A1 | 9/2015 |

OTHER PUBLICATIONS

Kidawara, et al."Utilization of Digital Content Based on Life Log in the Real-World", IPSJ Magazine 50(7), (2009), pp. 613-623.

Shuzuku, et al.: "A Method to Observe Exhibits with Sharing Interests Using Mixed Reality", Transactions of the Virtual Reality Society of Japan 20(4) (2015), pp. 273-281.

* cited by examiner

Voice database 31

| Voice | Waveform |
|---|---|
| a | /\w\ |
| i | /\/\ |
| u | \/\/ |
| e | ~\/ |
| o | ~\/\/ |
| ⋮ | ⋮ |

FIG. 6

Dictionary database 32

| Katakana | Language |
|---|---|
| アメ(ame) | rain |
| イル(iru) | is |
| イタ(ita) | was |
| イッシュウカン(isshuukan) | one week |
| エー(a) | A |
| ガ(ga) | ga |
| ガイチュウ(gaichuu) | Pest |
| カナ(kana) | kana |
| カレ(kare) | wither |
| クキ(kuki) | stem |
| ココ(koko) | here |
| サンジュウ(sanjuu) | 30 |
| シ(shi) | shi |
| シュウカク(shuukaku) | harvest |
| セイチョウ(seichou) | grow |
| ゼンゴ(zengo) | about |
| ゼンチ(zenchi) | cm |
| タ(ta) | ta |
| ダッタ(datta) | da tta |
| テ(te) | te |
| デ(de) | de |
| テンキ(tenki) | weather |
| ドジョウ(dojou) | soil |
| ニ(ni) | ni |
| ハ(ha) | ha |
| ハレ(hare) | sunny |
| マデ(made) | until |
| ヨホウ(yohou) | forecast |
| リョウコウ(ryoukou) | good |
| ⋮ | ⋮ |

FIG. 7

Web content database 33

1. Range specification

| Identification number | Field | Range | |
| --- | --- | --- | --- |
| | | Latitude | Longitude |
| 1 | Yamada field A | Northern latitude of 35°51'55" - Northern latitude of 35°52'10" | East longitude of 139°46'55" - East longitude of 139°47'5" |
| 2 | Yamada field B | Northern latitude of 35°52'10" - Northern latitude of 35°52'20" | East longitude of 139°46'55" - East longitude of 139°47'5" |
| 3 | Yamada field C | Northern latitude of 35°52'20" - Northern latitude of 35°52'30" | East longitude of 139°46'55" - East longitude of 139°47'5" |
| ... | ... | ... | ... |

2. Growth state of crop

| Identification number | Date | Weather | Field | Crop | Stem | Soil | Harvest | Pest | Withering |
| --- | --- | --- | --- | --- | --- | --- | --- | --- | --- |
| 1 | February 1, 2017 | Sunny | Yamada field A | Scallion | 20 cm | Good | | | |
| | February 7, 2017 | Cloudy | Yamada field A | Scallion | 25 cm | Good | | | |
| | February 14, 2017 | Sunny | Yamada field A | Scallion | | | | | |
| ... | ... | ... | ... | ... | ... | ... | ... | ... | ... |

FIG. 8

Classification database 34

| Words et al. | Items |
|---|---|
| Scallion | Crop |
| Chinese cabbage | Crop |
| Radish | Crop |
| XX cm | Stem |
| XX m | Stem |
| Good | Soil |
| Optimal | Soil |
| Not so bad | Soil |
| Bad | Soil |
| XX months | Harvest |
| XX weeks | Harvest |
| XX days | Harvest |
| Tomorrow | Harvest |
| There is pest | Pest |
| It is withered | Withering |
| ⋮ | ⋮ |

SPEECH DETAIL RECORDING SYSTEM AND METHOD

CROSS-REFERENCE TO RELATED APPLICATIONS

This application is a 371 of International Patent Application No. PCT/JP2017/013825 filed on Mar. 31, 2017, which is incorporated herein by reference in its entirety.

TECHNICAL FIELD

The present disclosure relates to a voice detail recording system and method, and a program.

BACKGROUND

In the past, a technology for converting details of the recorded voice into a text has been proposed (refer to Patent Literature 1).

LITERATURE IN THE RELATED ART

Patent Literature

Patent Literature 1: Japanese Patent Publication number JP 2014-202848

SUMMARY

It is very complicated for an agricultural worker to make records while doing agricultural work. A system which can make records by merely recording a voice about a working state and converting the recorded voice into a text. However, for an occupation in agriculture within a wide range with a certain area, when the working state is recorded, it will be more convenient for the agricultural worker to link the working state to position information and record the working state in form of text.

The present disclosure is proposed in view of such an expectation and aims to provide a system for recording the voice about the working state, etc., linking the recorded voice to the position information, and converting the recorded voice into the text.

In a first feature, the present disclosure provides a voice detail recording system, which records details obtained through voice recognition in Web content. The voice detail recording system includes an acquisition unit, a voice recognition unit, a specifying unit and a recording unit. The acquisition is configured to acquire a voice and a position where the voice is uttered. The voice recognition unit is configured to perform the voice recognition on the acquired voice. The specifying unit is configured to specify the Web content linked to the acquired position. The recording unit is configured to record the details obtained through the voice recognition in the specified Web content.

According to the first feature, when the acquisition unit acquires the voice, the voice recognition unit recognizes the voice and the specifying unit specifies the Web content linked to a position where the acquisition unit acquires the voice. The recording unit records the details obtained through the voice recognition in the Web content specified by the specifying unit. Therefore, it is possible to provide a system which links the details of the voice to the position where the voice is uttered acquired by the acquisition unit and records the details of the voice and the position in the Web content.

In a second feature, the present disclosure provides the voice detail recording system in accordance with the first feature, where the specifying unit is configured to determine whether the acquired position is within a specified range and specify Web content linked to the specified range.

For the occupation in agriculture within the wide range with the certain area, if the position where the voice is uttered is determined exactly, a large volume of data is generated and the system will be difficult to use. According to the second feature, management is performed by linking the Web content to the specified range, thereby avoiding too large a volume of data and a complicated system.

In a third feature, the present disclosure provides the voice detail recording system in accordance with the first feature or the second feature, where the recording unit is configured to, overwrite and record the details obtained through the voice recognition in a case where information already exists in the specified Web content.

According to the third feature, working records and the like of the agricultural work can be managed in a time sequence.

In a fourth feature, the present disclosure provides the voice detail recording system in accordance with any one of the first feature to the third feature, where the recording unit is configured to, based on the details obtained through the voice recognition, record, a specified detail obtained through the voice recognition and associated with the specified item in a specified item in the specified Web content.

With the invention according to the fourth feature, the specified detail obtained through the voice recognition is recorded in the specified item in the Web content. Therefore, it is possible to provide a system which does not record unnecessary content in the Web content and is more convenient for a user.

In a fifth feature, the present disclosure provides the voice detail recording system in accordance with any one of the first feature to the fourth feature, where the acquisition unit is configured to acquire the voice, the position where the voice is uttered and a date of uttering the voice, and the specifying unit is configured to specify the Web content linked to the acquired position and date.

According to the fifth feature, the Web content is linked to the date, and it is possible to provide a system which is more convenient for the user.

In a sixth feature provides the voice detail recording system in accordance with any one of the first feature to the fifth feature, where the Web content has a map including the position, and the recording unit is configured to superimpose and display the details obtained through the voice recognition on the map of the Web content.

According to the sixth feature, the voice is acquired through the acquisition unit, thus the details of the voice acquired by the acquisition unit are linked to the position where the voice is uttered and the details of the voice and the position are recorded in the Web content. Moreover, the details obtained through the voice recognition are superimposed and displayed on the map of the Web content. Therefore, it is possible to provide a system which is more convenient for the user.

In a seventh feature, the present disclosure provides the voice detail recording system in accordance with any one of the first feature to the sixth feature, where the acquisition unit is configured to acquire the voice from smart glasses and acquire the position where the voice is uttered according to a position of the smart glasses.

According to the seventh feature, since no terminal needs to be carried, it is possible to provide a system which is more convenient for the user in the agricultural work whose hands are often occupied by a work tool.

In an eighth feature provides the voice detail recording system in accordance with the seventh feature, where the Web content has the map including the position, and the recording unit is configured to superimpose and display a current position of the smart glasses on the map of the Web content.

According to the eighth feature, no terminal needs to be carried and the details obtained through the voice recognition are superimposed and displayed on the map of the Web content. Therefore, it is possible to provide the system which is more convenient for the user in the agricultural work whose hands are often occupied by the work tool.

With the present disclosure, it is possible to provide a system in which the voice is acquired through the acquisition unit, so as to link the details of the voice acquired by the acquisition unit to the position where the voice is uttered and record the details of the voice and the position in the Web content.

DETAILED DESCRIPTION

Embodiments for implementing the present disclosure will be described below with reference to the accompanying drawings. It is to be noted that the embodiments are only examples and not intended to limit the scope of the present disclosure.

Composition of a Voice Detail Recording System 1

Figure 1:
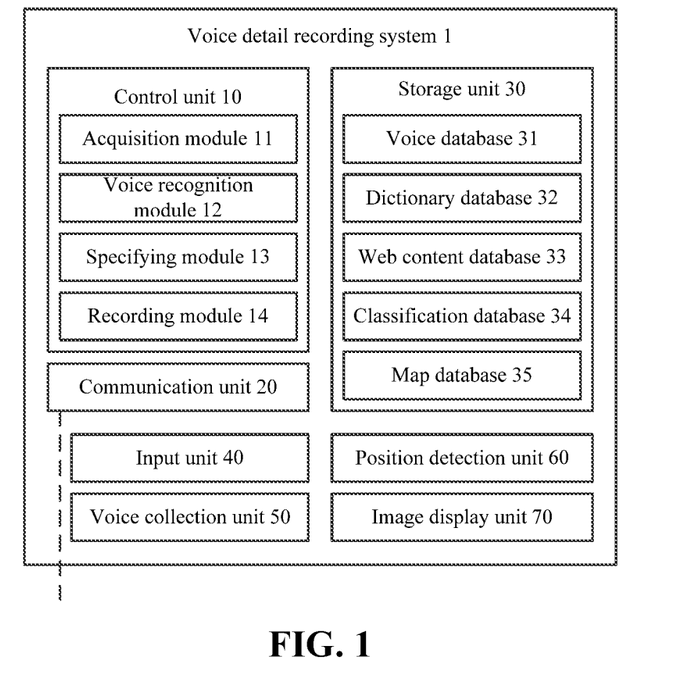
FIG. 1 is a block diagram illustrating hardware composition and software functions of a voice detail recording system 1 in the present embodiment.

FIG. 1 is a block diagram illustrating hardware composition and software functions of a voice detail recording system 1 in the present embodiment.

The voice detail recording system 1 includes a control unit 10 for controlling data, a communication unit 20 for communicating with other devices, a storage unit 30 for storing the data, an input unit 40 for receiving an operation of a user, a voice collection unit 50 for collecting a voice of the user, a position detection unit 60 for detecting a position of the voice detail recording system 1 and an image display unit 70 for outputting the data controlled by the control unit 10 and displaying an image controlled by the control unit 10.

The voice detail recording system 1 may be a standalone system integrally provided in a portable terminal such as a smart phone, smart glasses or a smart watch, or may be a cloud system including the portable terminal and a server connected to the portable terminal via a network. In the present embodiment, for simplicity of description, the voice detail recording system 1 is described as the standalone system.

The control unit 10 includes a central processing unit (CPU), a random access memory (RAM), a read only memory (ROM) and the like.

The communication unit 20 includes a device capable of communicating with other devices, for example, a wireless fidelity (Wi-Fi) device based on IEEE802.11.

The control unit 10 reads a specified program and cooperates with the communication unit 20 as required, so as to implement an acquisition module 11, a voice recognition module 12, a specification module 13 and a recording module 14.

The storage unit 30 is a means for storing data and files and includes a data storage unit implemented by a hard disk, a semiconductor memory, a recording medium, a memory card or the like. The storage unit 30 stores a voice database 31, a dictionary database 32, a Web content database 33, a classification database 34 and a map database 35 which will be described later. In addition, the storage unit 30 stores data of the image displayed by the image display unit 70.

A type of the input unit 40 is not particularly limited. The input unit 40 may include, for example, a keyboard, a mouse, a touch panel and the like.

A type of the voice collection unit 50 is not particularly limited. The voice collection unit 50 may include, for example, a microphone and the like.

The position detection unit 60 is not particularly limited as long as it is a means capable of detecting a latitude and a longitude where the voice detail recording system 1 is located. The position detection unit 60 may include, for example, a global positioning system (GPS).

A type of the image display unit 70 is not particularly limited. The image display unit 70 may include, for example, a display, the touch panel and the like.

Flowchart of a Voice Detail Recording Method Using the Voice Detail Recording System 1

Figure 2:
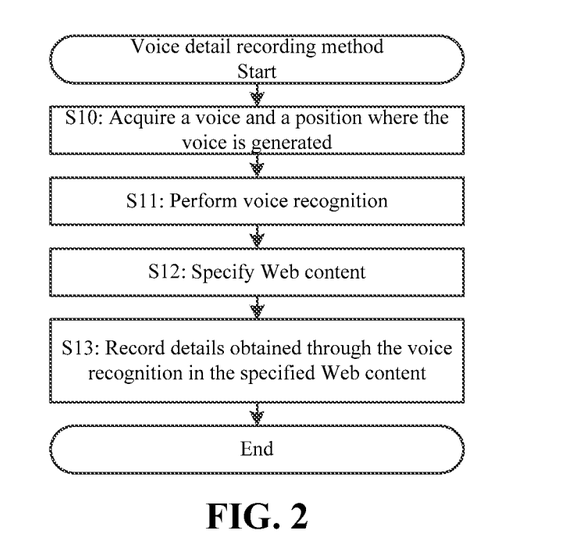
FIG. 2 is a flowchart of a voice detail recording method in the present embodiment.

FIG. 2 is a flowchart of a voice detail recording method using a voice detail recording system 1. Processing performed by the above-mentioned hardware and software modules will be described.

In step S10, a voice and a position where the voice is uttered are acquired.

The control unit 10 in the voice detail recording system 1 executes the acquisition module 11 to acquire the voice and the position where the voice is uttered (step S10). In addition, although unnecessary, the control unit 10 further acquires a date on which the voice is uttered with reference to a calendar (not shown) stored in the storage unit 30.

Figure 3:
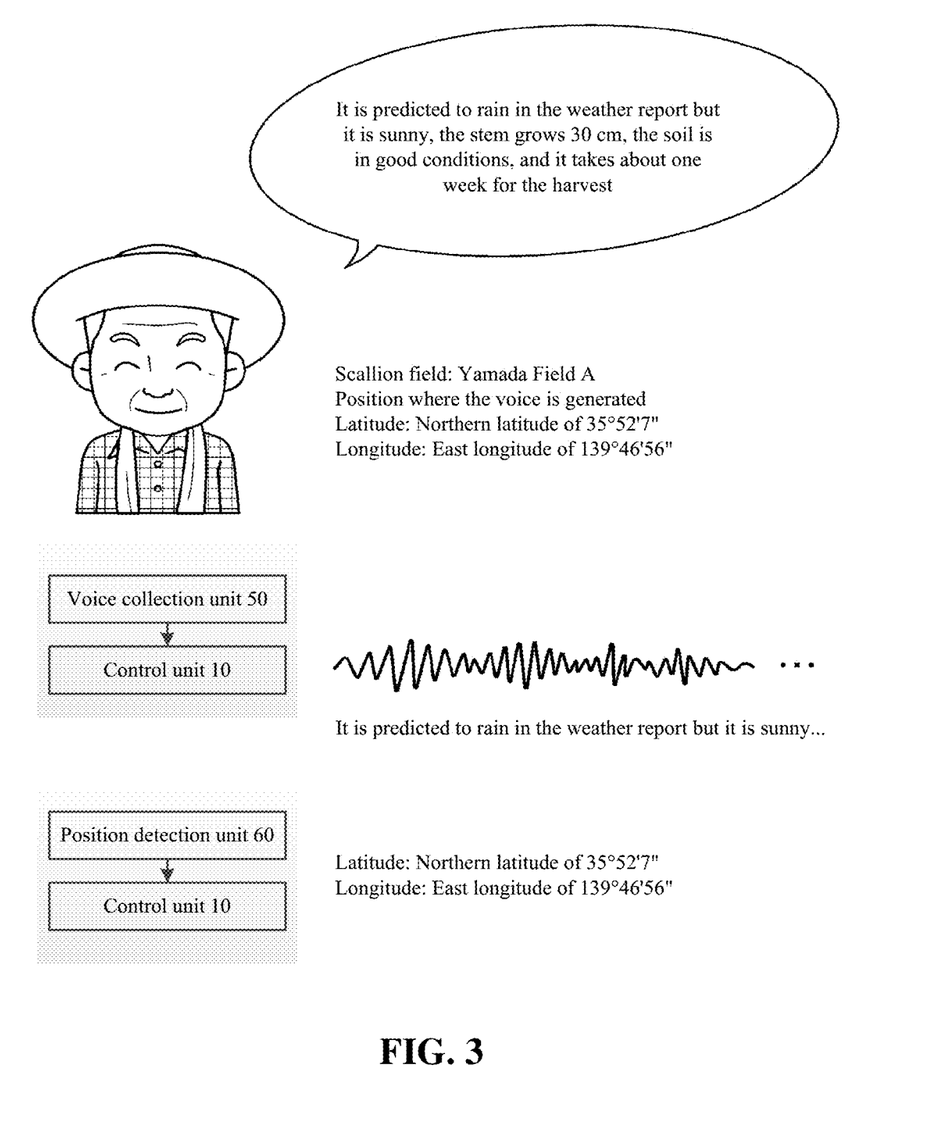
FIG. 3 shows an example for describing content of an acquisition module 11.
Figure 4:
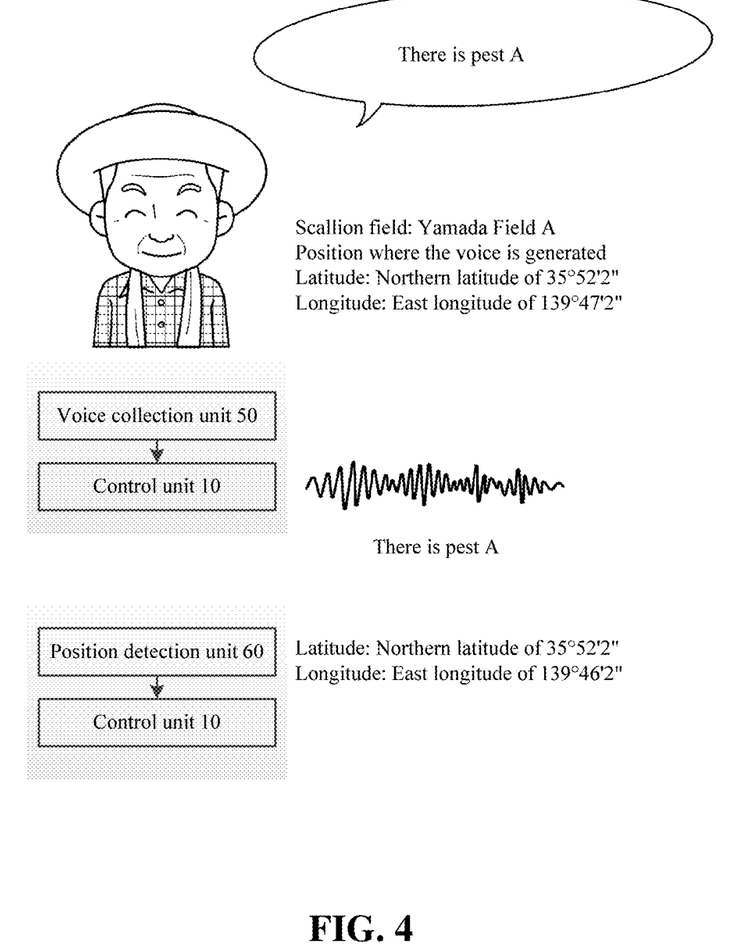
FIG. 4 shows an example following FIG. 3.
Figure 5:
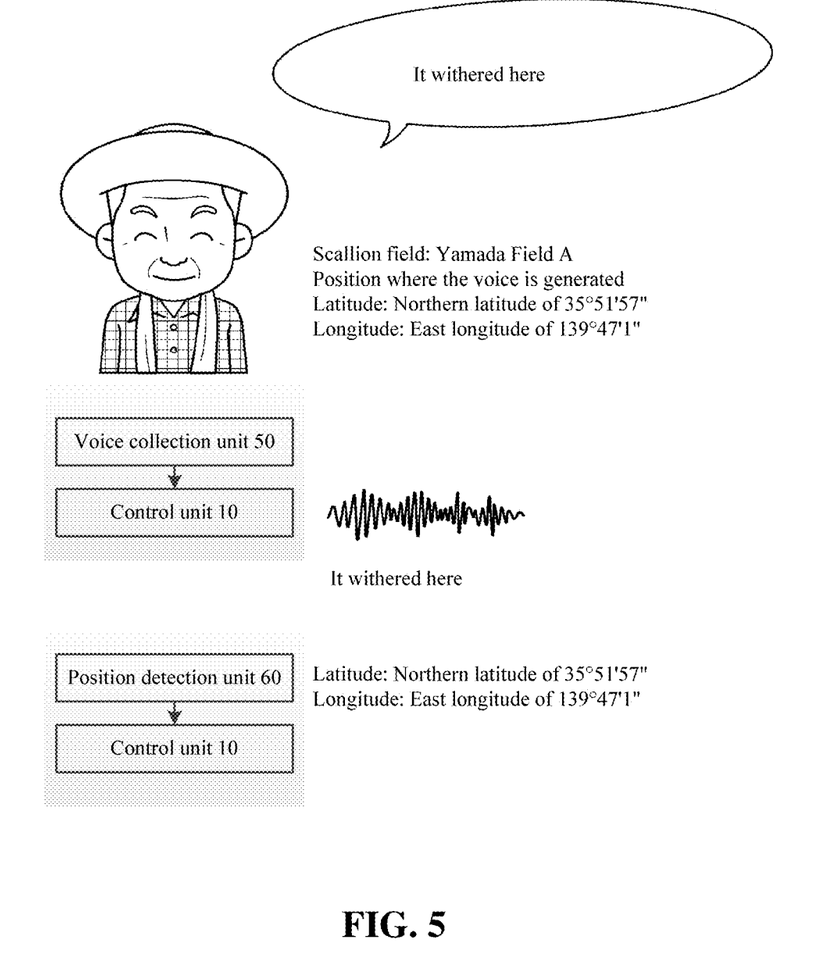
FIG. 5 shows an example following FIG. 4.

FIGS. 3 to 5 are used for describing an example of the processing in step S10. Here, a case where a farmer who manages a Yamada Farm observes a scallion field in a Yamada Farm A is described. As shown in FIG. 3, the farmer utters, at a northern latitude of 35°52'7" and an east longitude of 139°46'56", a voice "it is predicted to rain in the weather report but it is sunny, the stem grows 30 cm, the soil is in good conditions, and it takes about one week for the harvest".

The voice collection unit 50 in the voice detail recording system 1 collects the voice. The control unit 10 performs A/D conversion on the voice collected by the voice collection unit 50 and stores information obtained through the A/D conversion in a specified area of the storage unit 30.

At this time, the position detection unit 60 in the voice detail recording system 1 detects the latitude and the longitude where the voice detail recording system 1 is located. Here, the position detection unit 60 detects the northern latitude of 35°52'7" and the east longitude of 139°46'56". Information related to the position is also stored in the specified area of the storage unit 30 along with the information obtained through the A/D conversion.

As shown in FIG. 4, the farmer moves to a northern latitude of 35°52'2" and an east longitude of 139°47'52" and utters a voice "there is pest A".

The voice collection unit 50 in the voice detail recording system 1 collects the voice. The control unit 10 performs the A/D conversion on the voice collected by the voice collection unit 50 and stores information obtained through the A/D conversion in the specified area of the storage unit 30. At this time, the position detection unit 60 in the voice detail recording system 1 detects the latitude and the longitude where the voice detail recording system 1 is located. Information related to the position is also stored in the specified area of the storage unit 30 along with the information obtained through the A/D conversion.

As shown in FIG. 5, the farmer moves to a northern latitude of 35°51'57" and an east longitude of 139°47'1" and utters a voice "it withered here".

The voice collection unit 50 in the voice detail recording system 1 collects the voice. The control unit 10 performs the A/D conversion on the voice collected by the voice collection unit 50 and stores information obtained through the A/D conversion in the specified area of the storage unit 30. At this time, the position detection unit 60 in the voice detail recording system 1 detects the latitude and the longitude where the voice detail recording system 1 is located. Information related to the position is also stored in the specified area of the storage unit 30 along with the information obtained through the A/D conversion.

Although unnecessary, in the processing in step S10, the control unit 10 acquires the voice from the smart glasses and acquires the position where the voice is uttered according to a position of the smart glasses. Therefore, the user such as the farmer does not need to carry a terminal and it is possible to provide the voice detail recording system 1 which is more convenient for the user whose hands are often occupied by a work tool.

In step S11, voice recognition is performed.

Referring to FIG. 2, the control unit 10 in the voice detail recording system 1 executes the voice recognition module 12 to perform the voice recognition on the voices acquired in the processing in step S10 (step S11).

Figure 6:
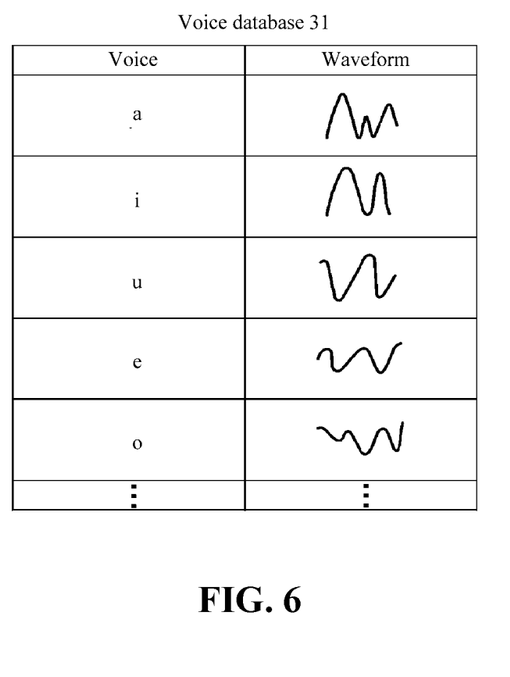
FIG. 6 shows an example of a voice database 31 in the present embodiment.

With reference to the voice database 31 shown in FIG. 6, the control unit 10 transcribes the voice collected by the voice collection unit 50 according to a waveform of a sound wave of the information obtained through the A/D conversion. Through voice recognition processing, the information obtained through the A/D conversion in a stage shown in FIG. 3 is changed as "ten ki yo hou de ha a me datta ga ha re ta/ku ki ga san zyussenti ni se i tyou si ta/do zyuu ha ryou kou/syuu ka ku ma de issyuu kan ka na". The information obtained through the A/D conversion in a stage shown in FIG. 4 is changed as "ko ko ni ga i tyuu e-ga i ta". The information obtained through the A/D conversion in a stage shown in FIG. 5 is changed as "ko ko ga ka re to i ru".

Figure 7:
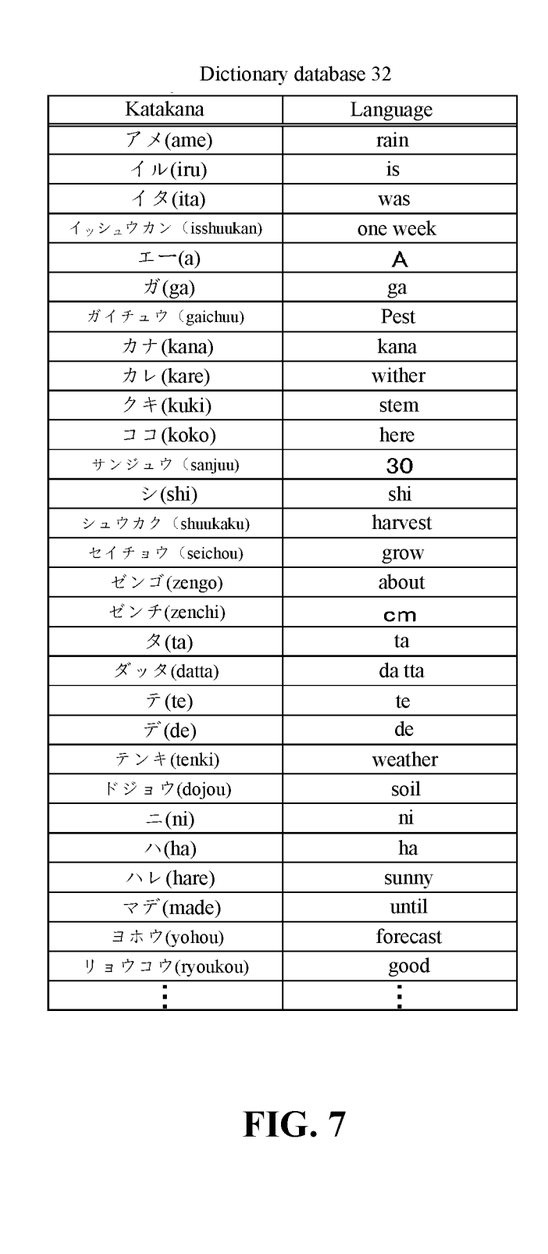
FIG. 7 shows an example of a dictionary database 32 in the present embodiment.

With reference to the dictionary database 32 shown in FIG. 7, the control unit 10 replaces the transcribed information with languages to form a text. Through the processing, the information obtained through the A/D conversion in the stage shown in FIG. 3 is changed as "it is predicted to rain in the weather report but it is sunny, the stem grows 30 cm, the soil is in good conditions, and it takes about one week for the harvest". The information obtained through the A/D conversion in the stage shown in FIG. 4 is changed as "there is pest A". The information obtained through the A/D conversion in the stage shown in FIG. 5 is changed as "it withered here".

Texts are linked to the information obtained through the A/D conversion and the information related to the position and stored in the specified area of the storage unit 30.

In step S12, Web content is specified.

Referring to FIG. 2, the control unit 10 in the voice detail recording system 1 executes the specification module 13 to specify the Web content linked to position information acquired in the processing in step S10.

Figure 8:
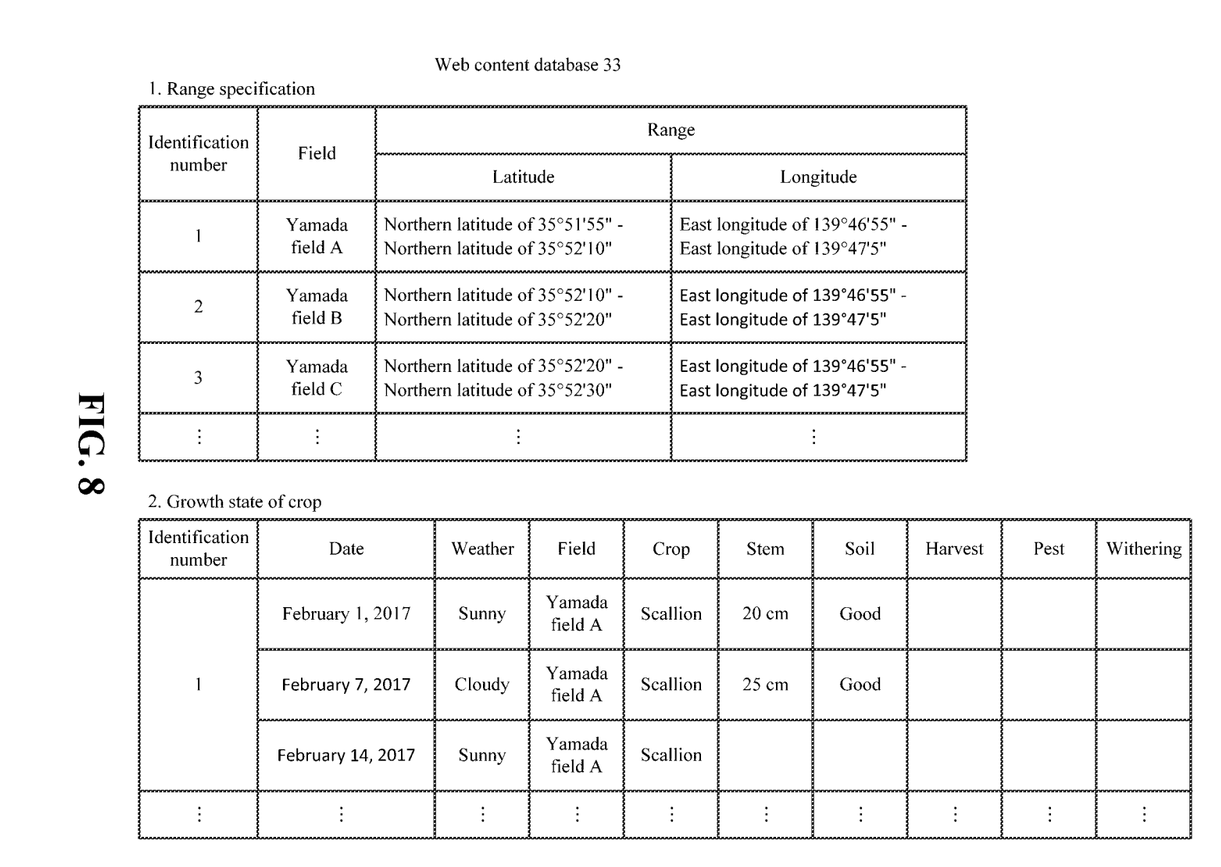
FIG. 8 shows an example of a Web content database 33 in the present embodiment.

The control unit 10 takes reference of the Web content database 33. FIG. 8 shows an example of the Web content database 33. In the Web content database 33, information related to the field and a range of the field is pre-stored in association with an identification number.

For example, an area surrounded by a northern latitude of 35°51'55", a northern latitude of 35°52'10", an east longitude of 139°46'55" and an east longitude of 139°47'5" is an area of the Yamada Farm A. The area of the Yamada Farm A is associated with an identification number 1.

Similarly, an area surrounded by a northern latitude of 35°52'10", a northern latitude of 35°52'20", the east longitude of 139°46'55" and the east longitude of 139°47'5" is an area of a Yamada Farm B. The area of the Yamada Farm B is associated with an identification number 2.

The position information after the stages shown in FIGS. 3 to 5 and stored in the specified area of the storage unit 30 includes: (1) the northern latitude of 35°52'7" and the east longitude of 139°46'56", (2) the northern latitude of 35°52'2" and the east longitude of 139°47'52", and (3) the northern latitude of 35°51'57" and the east longitude of 139°47'1". With reference to the Web content database 33, these pieces of position information are all located within a range specified by the Yamada Farm A with the identification number 1. Therefore, the control unit 10 is able to specify the Web content linked to the position information acquired in the processing in step S10 as Web content of the Yamada Farm A with the identification number 1.

In the present embodiment, the control unit 10 determines whether the positions acquired in the processing in step S10 are within a specified range determined in the Web content database 33 and specifies the Web content linked to the specified range. For example, for an occupation in agriculture within a wide range with a certain area, if the position where the voice is uttered is determined exactly, a large volume of data is generated and the system will be difficult to use. According to the present disclosure, management is performed by linking the Web content to the specified range, thereby avoiding too large volume of data and too complicated system.

Information on a growth state of a crop is also recorded in the Web content database 33. Items such as "date", "weather", "field", "crop", "stem", "soil", "harvest", "pest" and "withering" are listed up in the Web content database 33.

For example, states on Feb. 1, 2017 and Feb. 7, 2017 have been recorded. It is February 14 today. The calendar (not shown) stored in the storage unit 30 is read by the control unit 10, and the data today, February 14, is recorded in advance in the item "date" of the Web content database 33. In addition, the control unit 10 reads weather information from an external Web site providing the weather report via the communication unit 20, and the weather today, "sunny", is recorded in advance in the item "weather" of the Web content database 33.

In addition, in the items "field" and "crop" of the Web content database 33, the control unit 10 takes reference of previous information, and information such as "the Yamada Farm A" and "the scallion" are recorded in advance.

According to the present embodiment, in the processing in step S10, the control unit 10 acquires the voice, the position where the voice is uttered, and the date on which the voice is uttered. In the processing in step S12, the control unit 10 specifies the Web content linked to the position and the data acquired in the processing in step S10. Therefore, the web content is linked to the date, and it is possible to provide the voice detail recording system 1 which is more convenient for the user.

In step S13, details obtained through the voice recognition are recorded in the specified Web content.

Referring to FIG. 2, the control unit 10 in the voice detail recording system 1 executes the recording module 14 to record (step S13) the details obtained through the voice recognition in the processing in step S11 in the specified Web content in the processing in step S12.

The control unit 10 reads the details obtained through the voice recognition in the processing in step S11. The pieces of information including "it is predicted to rain in the weather report but it is sunny, the stem grows 30 cm, the soil is in good conditions, and it takes about one week for the harvest", "there is pest A", and "it withered here" are sequentially stored in the specified area of the storage unit 30. The control unit 10 reads these pieces of information from the specified area of the storage unit 30.

Figure 9:
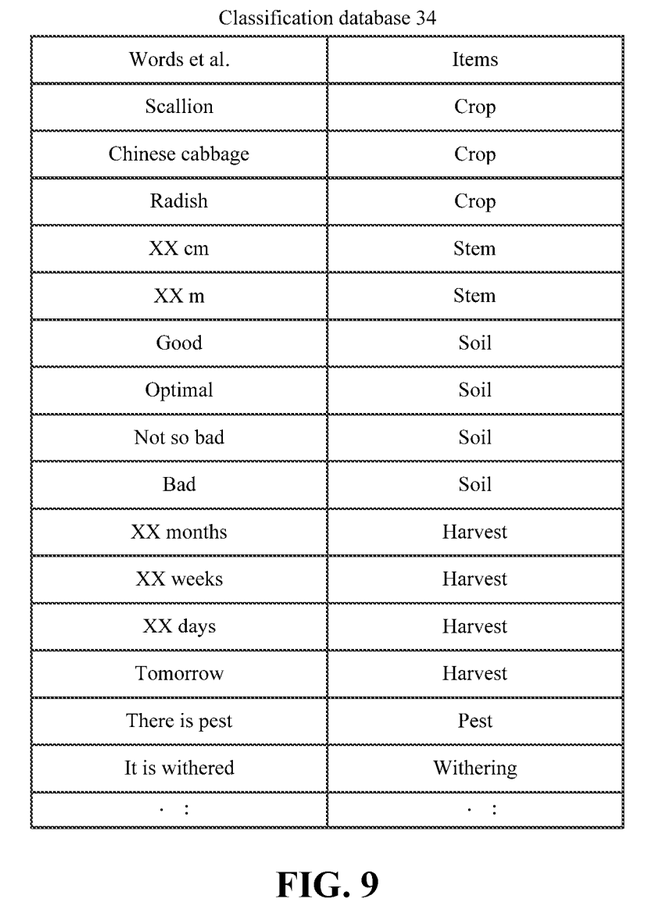
FIG. 9 shows an example of a classification database 34 in the present embodiment.

The control unit 10 takes reference of the classification database 34. FIG. 9 shows an example of the classification database 34. A relationship between words and the like included in the texts and the items listed up in the Web content database 33 is recorded in advance in the classification database. In the present embodiment, the items such as "date", "weather", "field", "crop", "stem", "soil", "harvest", "pest" and "withering" are listed up in the Web content database 33 (FIG. 8). Word groups associated with these items are recorded in the classification database 34.

One of the details obtained through the voice recognition, i.e., the information "it is predicted to rain in the weather report and it is sunny, the stem grows 30 cm, the soil is in good conditions, and it takes about one week for the harvest" is described. With reference to the classification database 34, the control unit 10 associates "30 cm" included in the information with the item "stem". In addition, "good" is associated with the item "soil", and "one week" is associated with the item "harvest". Therefore, the control unit 10 fills the item "stem" with "30 cm", fills the item "soil" with "good", and fills the item "harvest" with "about one week" at the position with the identification number 1 and the date of Feb. 14, 2017 in "2. growth state of the crop" in the Web content database 33 (FIG. 8).

In addition, the information "there is pest A" is described. With reference to the classification database 34, the control unit 10 associates "there is a pest" included in the information with the item "pest". Therefore, the control unit 10 fills the item "pest" with position information, the northern latitude of 35°52'2" and the east longitude of 139°47'52", when the information "there is pest A" is set and a type of pest "pest A" at the position with the identification number 1 and the date of Feb. 14, 2017 in "2. growth state of the crop" in the Web content database 33 (FIG. 8).

In addition, the information "it withered here" is described. With reference to the classification database 34, the control unit 10 associates "it withers here" included in the information with the item "withering". Therefore, the control unit 10 fills the item "withering" with position information, the northern latitude of 35°51'57" and the east longitude of 139°47'1", when the information "it withered here" is set at the position with the identification number 1 and the date of Feb. 14, 2017 in "2. growth state of the crop" in the Web content database 33 (FIG. 8).

In the present embodiment, the control unit 10 overwrites and records the details obtained through the voice recognition in the processing in step S11 in the case where information already exists in the specified Web content in the processing in step S12. Therefore, working records and the like of agricultural work can be managed in a time sequence.

In addition, based on the details obtained through the voice recognition in the processing in step S11, the control unit 10 records, in a specified item (such as "date", "weather", "field", "crop", "stem", "soil", "harvest", "pest" and "withering") in the specified Web content in the processing in step S12, a specified detail obtained through the voice recognition and associated with the specified item.

Therefore, all of the pieces of information obtained through the voice recognition, including "it is predicted to rain in the weather report but it is sunny, the stem grows 30 cm, the soil is in good conditions, and it takes about one week for the harvest", "there is pest A" and "it withered here", are not recorded in the Web content and unnecessary details can be deleted. Therefore, it is possible to provide the voice detail recording system 1 which is more convenient for the user.

In step S14, an image display of the web content is performed.

Referring to FIG. 2, the control unit 10 in the voice detail recording system 1 displays the web content recorded in the processing in step S13 on the image display unit 70.

Figure 10:
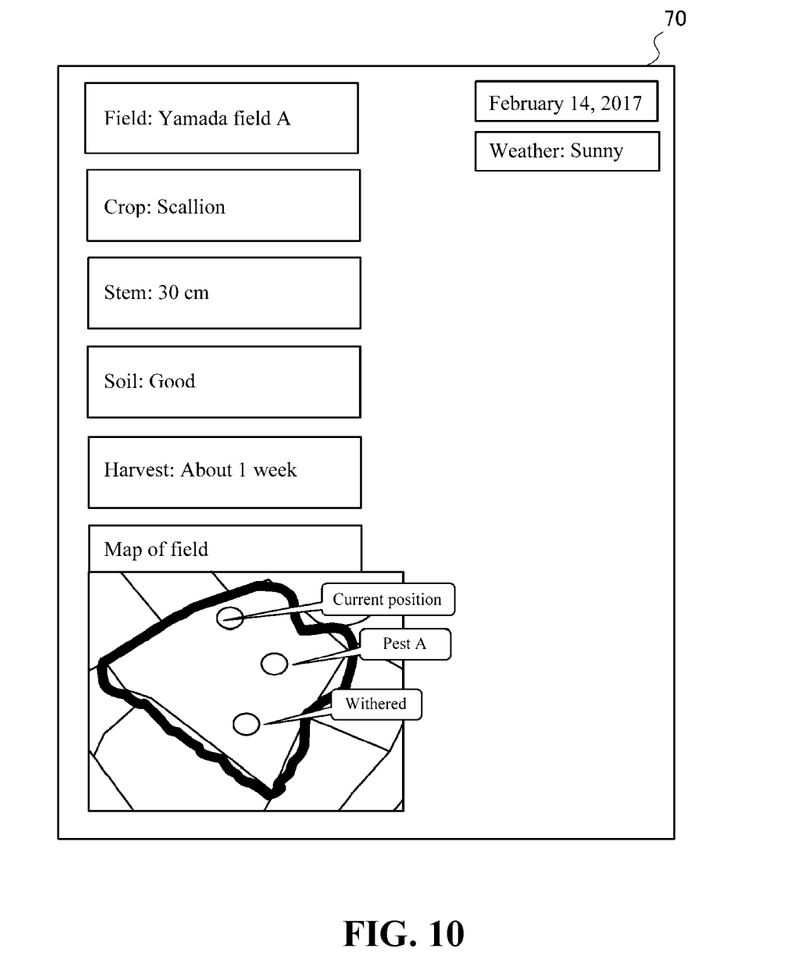
FIG. 10 shows an example of display content of an image display unit 70 in the present embodiment.

FIG. 10 shows a display example of the image display unit 70.

The image display unit 70 displays information recorded in the Web content database 33. Specifically, today's date, "2017/2/14", is displayed on the top right of the image display unit 70 and today's weather, "sunny", is displayed below the date.

In addition, "Yamada Farm A" as the field, "scallion" as the crop, "30 cm" as the growth state of the stem of the crop, "good" as the soil and "about one week" as harvest time are sequentially displayed from top to bottom on the left of the image display unit 70.

In addition, with reference to the map database 35, the control unit 10 displays a map of the area with the identification number 1 in the Web content database 33 on the image display unit 70. Moreover, the control unit 10 displays a point detected by the position detection unit 60 as a "current position" on the map. In addition, the control unit 10 displays a point set as the item "pest" in the Web content database 33 as a position where the pest exists on the map. In addition, the control unit 10 displays a point set as the item "withering" in the Web content database 33 as a position where it withered on the map.

According to the present disclosure, the control unit 10 acquires the voice in the processing in step S10, the control unit 10 recognizes the voice in the processing in step S11, and the control unit 10 specifies the Web content linked to the position where the voice is acquired in the processing in step S12. The control unit 10 records the details obtained through the voice recognition in the specified Web content in the processing in step S13. Therefore, it is possible to provide the voice detail recording system 1 which links the details of the voice acquired by the control unit 10 in the processing in step S10 to the position where the voice is uttered and records the details of the voice and the position in the Web content.

In addition, the Web content displayed on the image display unit 70 has the map including the position information represented by the position where the voice is uttered, and the control unit 10 superimposes and displays the details obtained through the voice recognition in the processing in step S11 on the map of the Web content. According to the present disclosure, by acquiring the voice in the processing in step S10, the control unit 10 links the details of the acquired voice to the position where the voice is uttered and records the details of the voice and the position in the Web content. Moreover, the control unit 10 superimposes and displays the details obtained through the voice recognition on the map of the Web content on the image display unit 70. Therefore, it is possible to provide the voice detail recording system 1 which is more convenient for the user.

The above-mentioned units and functions are implemented by reading and executing specified programs by a computer (including the CPU, an information processing means and various terminals). The programs are provided in the form of being recorded on a computer-readable recording medium such as a floppy disk, a compact disk (CD) (such as a compact disc read-only memory (CD-ROM)), and a digital versatile disc (DVD) (such as a digital versatile disc read-only memory (DVD-ROM) and a digital versatile disc random access memory (DVD-RAM)). In this case, the computer reads the programs from its recording medium and transfers the programs to an internal storage means or an external storage means for storage and execution. In addition, for example, the programs may also be recorded in advance on a storage means (recording medium) such as a magnetic disk, an optical disk or a magneto-optical disk and provided for the computer via a communication line.

The embodiments of the present disclosure have been described above, but the present disclosure is not limited to the above-mentioned embodiments. In addition, the effects described in the embodiments of the present disclosure are merely illustrative of the best effects produced by the present disclosure, and the effects of the present disclosure are not limited to the effects described in the embodiments of the present disclosure.

LIST OF REFERENCE NUMBERS

1: Voice detail recording system
10: Control unit
11: Acquisition module
12: Voice recognition module
13: Specifying module
14: Recording module
20: Communication unit
30: Storage unit
31: Voice database
32: Dictionary database
33: Web content database
34: Classification database
35: Map database
40: Input unit
50: Voice collection unit
60: Position detection unit
70: Image display unit

What is claimed is:

1. A voice detail recording system, wherein the system is configured to record details obtained through voice recognition in Web content, wherein the system comprises:

an acquisition unit, configured to acquire a voice and a position where the voice is uttered;
a voice recognition unit, configured to perform the voice recognition on the acquired voice;
a specifying unit, configured to specify the Web content linked to the acquired position; and
a recording unit, configured to record the details obtained through the voice recognition in the specified Web content,
wherein the recording unit is configured to:
establish a classification database based on a plurality of items in the Web content and respective words corresponding to the items;
specify an item associated with the details obtained through the voice recognition according to the details obtained through the voice recognition; and
record the details obtained through the voice recognition in the specified item,
wherein the specifying unit is configured to determine whether the acquired position is within a specified range and specify Web content linked to the specified range,
wherein the Web content has a map comprising the position,
the recording unit is configured to superimpose and display the details obtained through the voice recognition on the map of the Web content.

2. The voice detail recording system of claim 1, wherein the recording unit is configured to overwrite and record the details obtained through the voice recognition in a case where information already exists in the specified Web content.

3. The voice detail recording system of claim 1, wherein the recording unit is configured to, based on the details obtained through the voice recognition, record a specified detail obtained through the voice recognition and associated with the specified item in a specified item in the specified Web content.

4. The voice detail recording system of claim 1, wherein the acquisition unit is configured to acquire the voice, the position where the voice is uttered and a date of uttering the voice;
the specifying unit is configured to specify the Web content linked to the acquired position and date.

5. The voice detail recording system of claim 1, wherein the acquisition unit is configured to acquire the voice from smart glasses and acquire the position where the voice is uttered according to a position of the smart glasses.

6. The voice detail recording system of claim 5, wherein the recording unit is configured to superimpose and display a current position of the smart glasses on the map of the Web content.

7. A voice detail recording method, wherein the method records details obtained through voice recognition in Web content, wherein the method comprises:
acquiring a voice and a position where the voice is uttered;
performing the voice recognition on the acquired voice;
specifying the Web content linked to the acquired position; and
recording the details obtained through the voice recognition in the specified Web content,
wherein the step of recording the details obtained through the voice recognition in the specified Web content comprises:

establishing a classification database based on a plurality of items in the Web content and respective words corresponding to the items;

specifying an item associated with the details obtained through the voice recognition according to the details obtained through the voice recognition; and recording the details obtained through the voice recognition in the specified item, wherein the step of specifying the Web content linked to the acquired position comprises:

determining whether the acquired position is within a specified range and specifying Web content linked to the specified range, wherein the Web content has a map comprising the position, the step of recording the details obtained through the voice recognition in the specified Web content comprises:

superimposing and displaying the details obtained through the voice recognition on the map of the Web content.

8. A non-transitory computer readable medium encoded with a program for causing a voice detail recording system records details obtained through voice recognition in Web content to:

acquire a voice and a position where the voice is uttered;

perform he voice recognition on the acquired voice;

specify the Web content linked to the acquired position; and record the details obtained through the voice recognition in the specified Web content, wherein the step of recording the details obtained through the voice recognition in the specified Web content comprises:

establishing a classification database based on a plurality of items in the Web content and respective words corresponding to the items;

specifying an item associated with the details obtained through the voice recognition according to the details obtained through the voice recognition; and recording the details obtained through the voice recognition in the specified item, wherein the step of specifying the Web content linked to the acquired position comprises:

determining whether the acquired position is within a specified range and specifying Web content linked to the specified range, wherein the Web content has a map comprising the position, the step of recording the details obtained through the voice recognition in the specified Web content comprises:

superimposing and displaying the details obtained through the voice recognition on the map of the Web content.

* * * * *